United States Patent [19]
Skillen et al.

[11] Patent Number: 5,802,043
[45] Date of Patent: Sep. 1, 1998

[54] TRANSPORT ARCHITECTURE AND NETWORK ELEMENTS

[75] Inventors: Richard Prescott Skillen, Mississauga; Frederick Caldwell Livermore, Stittsville; Brent E. Allen, Nepean, all of Canada

[73] Assignee: Northern Telecom Limited, Montreal, Canada

[21] Appl. No.: 755,431

[22] Filed: Nov. 21, 1996

[51] Int. Cl.⁶ .............................................. H04J 3/16
[52] U.S. Cl. ......................... 370/258; 370/403; 370/468
[58] Field of Search .................................. 370/258, 403, 370/404, 405, 465, 392, 393, 468, 477; 375/122; 340/825.05

[56] References Cited

U.S. PATENT DOCUMENTS

| | | | |
|---|---|---|---|
| 5,247,518 | 9/1993 | Takiyasu et al. | 370/85.15 |
| 5,293,976 | 3/1994 | White | 370/54 |
| 5,479,613 | 12/1995 | Geyer et al. | 370/468 |
| 5,504,747 | 4/1996 | Swazey | 370/403 |
| 5,590,124 | 12/1996 | Robins | 370/258 |
| 5,699,356 | 12/1997 | Beever et al. | 370/468 |

*Primary Examiner*—Chi H. Pham
*Assistant Examiner*—Ricky Q. Ngo
*Attorney, Agent, or Firm*—Yoshiharu Toyooka

[57] ABSTRACT

A novel transport architecture and network elements use nodes in a ring or virtual ring configuration. Information is exchanged among the nodes in a continuous series of containers carried in a superframe. A container is assigned to a destination node and is divided into partitions which are allocated for source nodes. Therefore, when a container destined to a particular destination node arrives at a node and if this node has information to send to the destination node, it fills the allocated partition within the container with information destined to the destination node. The sizes of the superframe, containers and partitions are all variable dynamically or statically.

29 Claims, 7 Drawing Sheets

Fig 1    ● Domain Node

- ⊚ SONET/SDH NE
- ⊜ Modified SONET/SDH NE
- ◯ Stevedore

TRANSPORT ARCHITECTURE AND NETWORK ELEMENTS

FIELD OF INVENTION

This invention relates generally to efficient transfer of digital information among nodes. In particular, it is directed to a novel digital transport architecture in which digital information is exchanged among nodes in a network in multiplex frames which carry one or more containers.

BACKGROUND OF INVENTION

Communication networks have been primarily used for voice communications but support limited data and computer communications. In recognition of the predominance of voice traffic, a circuit switched, channelized architecture emerged and was optimized for telephony. Data and computer communications access and transport have been provided as an overlay on this channelized infrastructure.

Although many data technologies have been developed over the past twenty years, the advent and subsequent popularity of the Internet, coupled with its ability to support multimedia services, including telephony (voice), has changed the way people communicate and do business. Bandwidth required for many services, including voice, is shrinking as a result of great improvements in compression technologies and platforms. Consequently today, telecommunications networks are shifting from specialized networks toward multipurpose, multi-functional networks. The requirement for 64 Kb/s for voice is no longer state of the art, hence networks based on this channelized technology will have limited application and no advantage in the future. Supporting infrastructure for this channelized architecture, including signalling and control, network design and management, access, transport, switching, and service vehicles, will all be replaced by simpler, more robust, and open alternatives.

For connecting many end users, a typical network is created by interconnecting them to a networking device which can provide interconnections between the users. In an IP data network this would be a router; in a voice telephony network this would be a voice switch; in an ATM data network this would be an ATM switch. In order for users attached to one networking device to exchange information with users attached to another remote networking device, the networking devices must be interconnected to each other via a transport system. Assuming that every user in the world wants to be able to exchange information with every other user in the world, it must be possible to interconnect every networking device with every other networking device. The simplest approach is for every networking device to have a physical connection to every other networking device, however, as the network size grows, this approach rapidly becomes impractical. A large number of physical connections would be required ($n(n-1)/2$ where n is the number of networking devices) and each networking device would have a large number of relatively low capacity interfaces, inefficiently utilizing the port capacity of the device. Thus it is common for the interconnection between two remote networking devices to tandem through one or more other networking devices. Often, a special tandem networking device is dedicated to this function, such that a number of networking devices have one connection to the tandem networking device resulting in a star topology. This allows efficient utilization of the network device interfaces, at the cost of the tandem networking device. In addition to cost, the tandem device can cause service degradation such as additional delay, delay variation, and traffic loss due to congestion.

Traditional transport systems can provide an alternative solution by providing logical layer virtual mesh interconnections between the networking devices. However, these connections are based on time division multiplexing (channelization), meaning that the bandwidth allocated to a connection is fixed and dedicated to that connection. Although the connection between two devices may be inactive for some period of time, the transport bandwidth is still reserved so that it cannot be utilized by other active connections. Thus the networking device interfaces may not be as efficiently utilized as in the tandem approach which allows interconnections from many networking devices to share the interface to a given device. Although the cost of tandeming is avoided, there is cost associated with this inefficiency.

U.S. Pat. No. 5,293,376, issued Mar. 8, 1994 (White), describes an upgradable telecommunication network which comprises a plurality of interconnected nodes or central offices, such as a SONET ring network. In its network, a unique controller enables a subscriber to change the central office or node in the network to which it is connected without changing the telephone number of the subscriber location.

U.S. Pat. No. 5,247,518, issued Sep. 21, 1993 (Takiyasu et al), teaches a high speed ring LAN system in which SONET subframes flow in a time-divisional n-multiplexed format. The respective node devices inserted in the transmission path have one or more ports to accommodate sub-LANs or public networks. Information is exchanged in units of a fixed-length packet between a received SONET subframe and an asynchronous port, whereas information is exchanged in units of a byte between the SONET subframe and a synchronous port.

The invention described in this patent application allows many networking devices to be interconnected with efficiently utilized interfaces, without incurring the cost and service degradation of a tandem device. A domain is defined where every networking device within the domain is connected to every other networking device within the domain with fixed or variable capacity. All the connections within the domain share a common pool of capacity, maximizing the utilization of the device interfaces. Since this new function is integrated into the transport network, the cost and service degradation associated with tandem networking devices is avoided. Various networking devices which use different protocols, such as ATM or IP, are accomodated by defining a container structure which carries digital information in its native form between them. The containers are carried on a digital facility with a defined bit rate that circulates on a ring or virtual ring past every networking device in the domain.

OBJECTS OF INVENTION

It is therefore an object of the invention to provide a new network architecture in which digital information is exchanged in a multiplex frame format.

It is yet another object of the invention to provide a new network architecture in which full mesh connectivity is achieved among nodes in a domain.

It is a further object of the invention to provide a new network architecture in which containers in a multiplex frame carry digital information in its native form or forms.

SUMMARY OF INVENTION

Briefly stated, the invention resides in a communications network including a domain containing a plurality of nodes connected in a ring or in a virtual ring. According to one aspect, the invention is directed to a method of providing a virtual mesh connectivity of digital information between source nodes and destination nodes among the nodes. The method comprises a step of transmitting into the domain a multiplex frame of digital information from a domain controller node. The multiplex frame consists of containers which are respectively allocated to the destination nodes, each container having partitions which are respectively allocated to source nodes. The method further comprises steps of loading the digital information at a source node into the respective partition of the container which is allocated to a destination node, and unloading the digital information at the destination node from the container.

According to another aspect, the invention is directed to a communications network for providing virtual mesh connectivity of digital information between source nodes and destination nodes. The network comprises the nodes being connected in a ring or in a virtual ring, one node being a domain controller node and the domain controller node including a transmitter for transmitting a multiplex frame of digital information into the ring. The multiplex frame consists of containers which are respectively allocated to the destination nodes, each container having partitions which are respectively allocated to the source nodes. Each source node has a container packer for loading the digital information into the partition allocated to it, of the container allocated to the destination node to which the digital information is destined, and each destination node has a container unpacker for unloading the digital information from the container allocated to it.

DETAILED DESCRIPTION OF THE PREFERRED EMBODIMENTS OF THE INVENTION

Figures 1, 3:
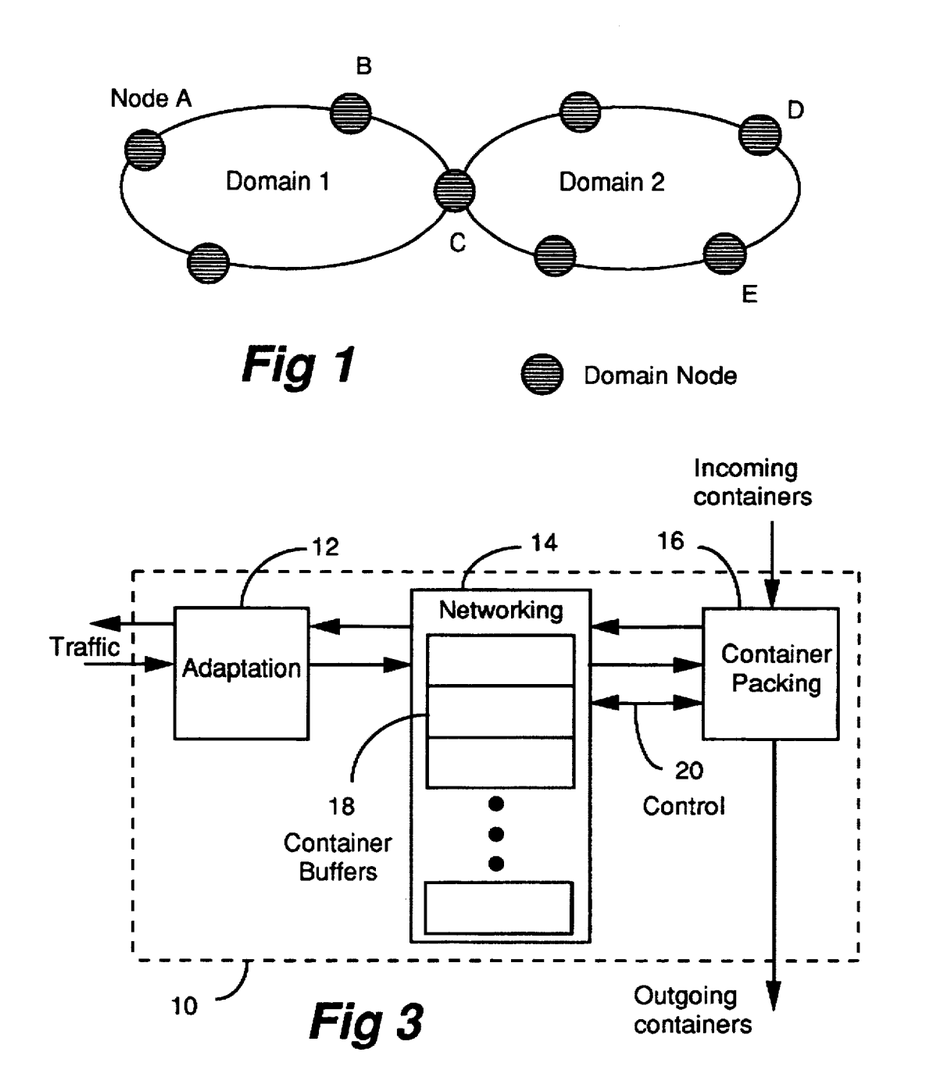
FIG. 1 shows a domain encompassing two rings forming a network.
FIG. 3 depicts domain node functionality according to one embodiment.

Referring to FIG. 1, according to the invention, information is exchanged among nodes in fully meshed connectivity. In this description, as mentioned earlier, the domain is a digital facility with a defined bit rate consisting of a continuous series of fixed size frames. Thus, in the figure, there are two domains: domain 1 and domain 2, which are formed by domain nodes in a ring or in a virtual ring. Node C participates in the both domains.

Figure 2:
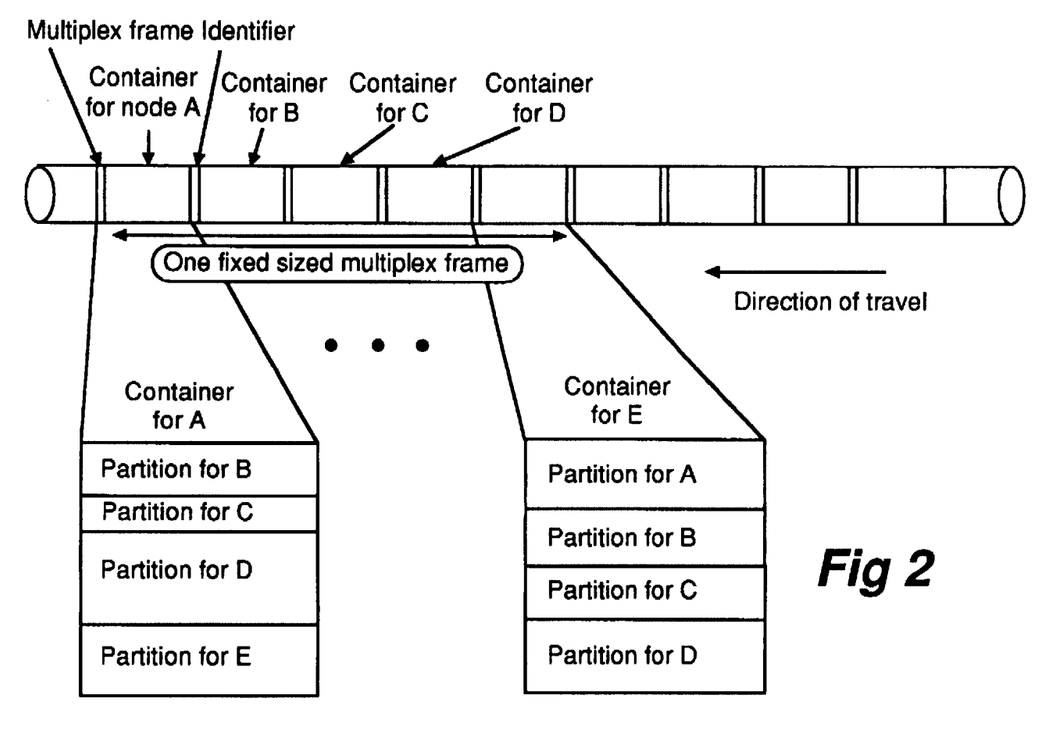
FIG. 2 shows the structure of a multiplex frame including containers and variable partitions according to one embodiment.

According to one embodiment, the continuous series of the fixed sized frames are organized into multiplex frames where each frame within the multiplex frame is a container that is destined to one of the domain nodes. Thus the domain carries a continuous train of containers that pass by each domain node. As a given container travels around the domain, all domain nodes can load information into partitions that have been allocated to them within the container. When the container reaches the destination node, the node unloads the payloads loaded into it by the other nodes. FIG. 2 illustrates this frame structure in which a series of containers is shown travelling in one direction. Each container is set aside for a particular node, e.g. containers for nodes A, B, C, etc. A certain number of containers (in this example, five containers) are organized into a multiplex frame which is identified as such by a multiplex frame identifier which also shows which container is set aside for which node. The figure further shows partitions within a container. Thus the container for node A has partitions for nodes B, C, D and E, whose sizes are relatively shown in the figure. The partition for node B within the container for node A is the bandwidth exclusively set aside for use by the traffic from node B to node A.

One of the domain nodes within the domain generates the multiplex frame and indicates the length and alignment of the multiplex frame by generating a multiplex frame identifier. This node is referred to as the domain controller. Other domain nodes can assume this responsibility in the event of failure of the original domain controller.

There are several parameters that impact the amount of bandwidth available between two domain nodes: the bandwidth of the domain, the length of the multiplex frame, the number of containers per multiplex frame allocated to the destination node, and the size of the partition within the container into which the source node is allowed to load its payload destined to the destination node. The allocated bandwidth of the domain determines the total capacity to be shared across the domain. The length of the multiplex frame and the number of containers per multiplex frame allocated to a domain node determines the throughput to that node. For example, the minimum bandwidth that can be allocated to a destination node is one container per multiplex frame. If the domain bandwidth is 50 Mb/s, and the multiplex frame is 10 frames long, then this bandwidth is 5 Mb/s. This bandwidth can be increased to 15 Mb/s either by increasing the domain bandwidth to 150 Mb/s or by allocating 3 containers per multiplex frame to that particular domain node. Finally, the partition of a container allocated to a given source node determines how much bandwidth the source node can send to that destination node.

These parameters can be fixed at provisioning time, or they can be adjusted dynamically to respond to changing traffic demands. For example, if the bandwidth of the domain with 5 nodes is fixed at 50 Mb/s, and a 10 frame multiplex frame is allocated with two containers per domain node, then each destination node can receive a maximum of 10 Mb/s. If each of the other nodes were only allowed to fill one quarter of each container, then the bandwidth between any two nodes is 2.5 Mb/s. An access protocol operating between all the nodes would allow partitions within a container to be adjusted dynamically. For example, one node could be given 5 Mb/s if two other nodes only require 1.25 Mb/s. Similarly, if a destination node requires more than 10 Mb/s, it could be allocated 3 containers per multiplex frame (15 Mb/s) if another destination node only requires one container (5 Mb/s). The granularity of this adjustment (5 Mb/s in this example) can be changed by going to a longer multiplex frame. This adjustment can also be made dynamically. Finally, all of the numbers in this example could be tripled by going to a 150 Mb/s domain. A cost/performance trade-off determines which parameters should be adjusted dynamically and how fast this adjustment needs to be.

The domain nodes receive incoming data streams in any format. The information is encapsulated into frames. A routing function determines the domain node to which the frame is forwarded. The frames are buffered until a container with the appropriate destination node comes by and are then inserted into the appropriate container partition.

FIG. 3 illustrates schematically functions of the domain node 10. In the figure, three major functional boxes are shown: the adaptation unit 12, networking unit 14, and container packing/unpacking unit 16. Adaptation unit 12 takes in, from peripherals, whatever information is to be transported across the network and puts it into a form appropriate for insertion into a container. Networking unit 14 looks at the destination of the information, either by looking at addressing within the service information itself, or via provisioning, and decides which domain node to forward the information to, and therefore, in which container to put the information. The network unit has a set of container buffers 18, each of which is assigned to each possible destination domain node. Once the networking unit 14 has determined the next domain node to forward the information to, it stores it in the buffer associated with the container allocated to the destination node.

Figure 4:
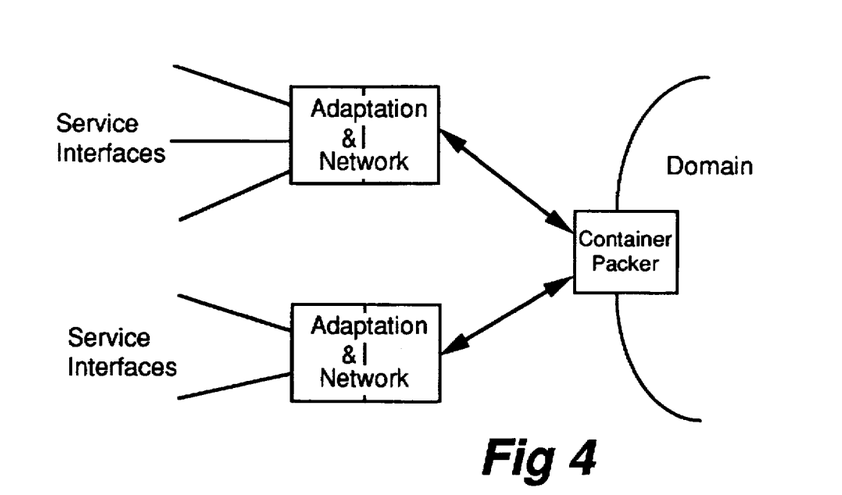
FIG. 4 illustrates a container packer/unpacker serving multiple networking units.
Figure 5:
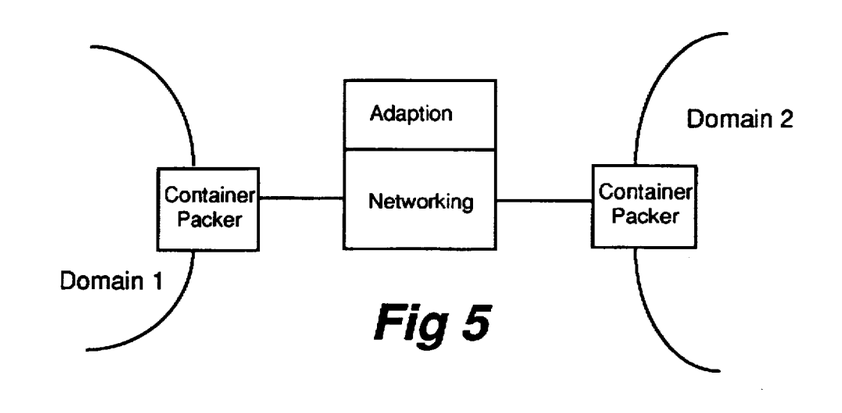
FIG. 5 shows inter-domain networking.

Networking unit 14 is responsible for sending the buffer contents to the container packing/unpacking unit 16 (or container packer for short). The container packer will indicate what buffers contents it wants, when and how much, via a control interface 20. This minimizes buffering in the container packer and allows the networking unit to be located remotely from the container packing function. It allows the container packer to service multiple adaptation/networking units simultaneously, as shown in FIG. 4, and it also allows given networking units to interface with other container packers operating in other domains, as shown in FIG. 5. More importantly, traffic which is of no interest to the local node passes directly through the container packer, minimizing the traffic that transits the networking unit. The networking unit will indicate to the container packer the state of its buffers so that the container packer can adjust the partitions allocated within outgoing containers.

The container packer receives the incoming containers. The containers that are destined for the domain node that contains the container packer are unloaded and sent to the networking unit. As containers destined for other domain nodes arrive, the container packer will request the appropriate buffer contents, via the control interface 20, from the networking unit and load it into the container partition allocated to this source node. With this information also comes an indication of buffer status that the container packer can use to request more or less space in subsequent outbound containers.

Figure 6:
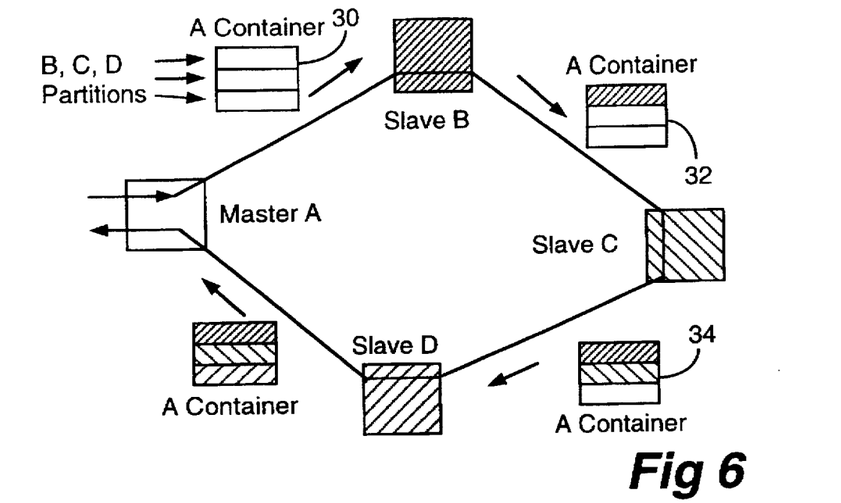
FIG. 6 illustrates the master-slave relationship of container packers/unpackers.

Referring to FIG. 6, container packers operate in a master/slave mode, with every packer being the master for the containers destined to the local domain node, and slave for each of the other containers. The master sources a container with partitions allocated to each of the other packers to fill in. The master can dynamically adjust the partitions in subsequent containers based on traffic demands. In the figure, therefore, the master packer (node A) sends out containers with the partitions defined for the slaves (nodes B, C and D) to fill in their information. In a further embodiment, rather than sending out empty containers, which would be wasteful of capacity, this bandwidth is utilized for additional capacity from the master to each of the slaves.

Figure 7:
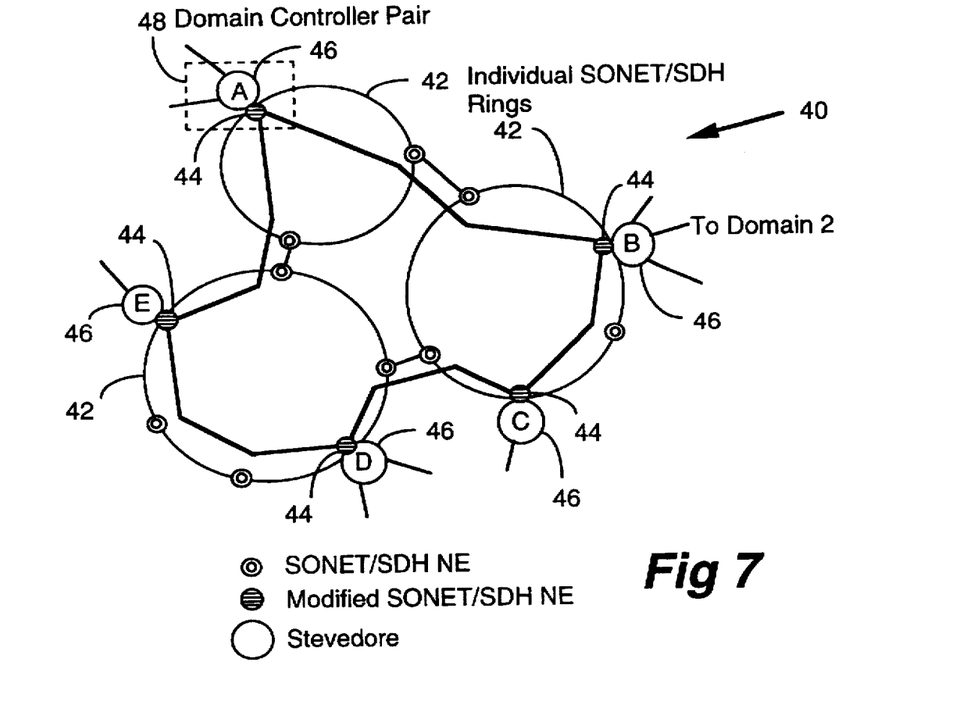
FIG. 7 shows a single domain in a network including modified nodes and stevedores.

Referring to FIG. 7, an example of the invention is illustrated. This example uses an STS-1 or STS-Nc path within a SONET/SDH transport to provide the domain 40. The SONET/SDH network itself may consist of linear, hubbed and ring structures at the line (physical) layer. In the Figure, the network is made up of a few individual SONET/SDH rings 42. Some or all of the domain node functions may be integrated into a SONET/SDH node which is modified to perform the above described functions of the invention. In this embodiment, however, the container packer function is integrated into this modified SONET/SDH node 44 and the adaptation and networking functions are combined into a device referred to as a stevedore 46. One SONET/SDH node-stevedore pair 48 is assigned as the domain controller node.

The stevedore therefore performs following functions:
a) interfaces to a variety of services;
b) adapts the incoming information by encapsulating into a data frame addressing and frame length information; performs corresponding de-encapsulating function in the opposite direction;
c) reads addresses of incoming frames from the adaptation function and determines from a routing table (established in shared memory) the next network hop and thus the appropriate container;
d) routes each packet to a stack in the appropriate buffer in shared memory for an outbound container; the stack may be FIFO or alternatively may use a service-based priority queuing algorithm;
e) transfers each cell to its associated container packer;
f) dialogs with other networking functions to establish optimum routes based on distance, congestion, failures, etc.
e) indicates buffer status to container packer or, alternatively, requests increases or decreases in outgoing capacity; and
f) reads all packet addresses arriving on inbound cells within the container for its node and either terminates on local service interfaces or forwards to another networking function via an outgoing container.

The modified SONET/SDH node performs the following functions:
a) receives payloads for outgoing containers from one or more networking functions;
b) packs payloads into appropriate outbound containers;
c) unloads containers allocated to the local stevedore;
d) controls the partitioning of the containers allocated to the local stevedore, responds to requests (implicit or explicit) for more or less capacity; and
e) container packer in the domain controller node sources the multiplex frame; other container packers may request more or fewer containers per multiplex frame.

It should be noted, of course, that all of these functions can be integrated into one unit.

Figure 8:
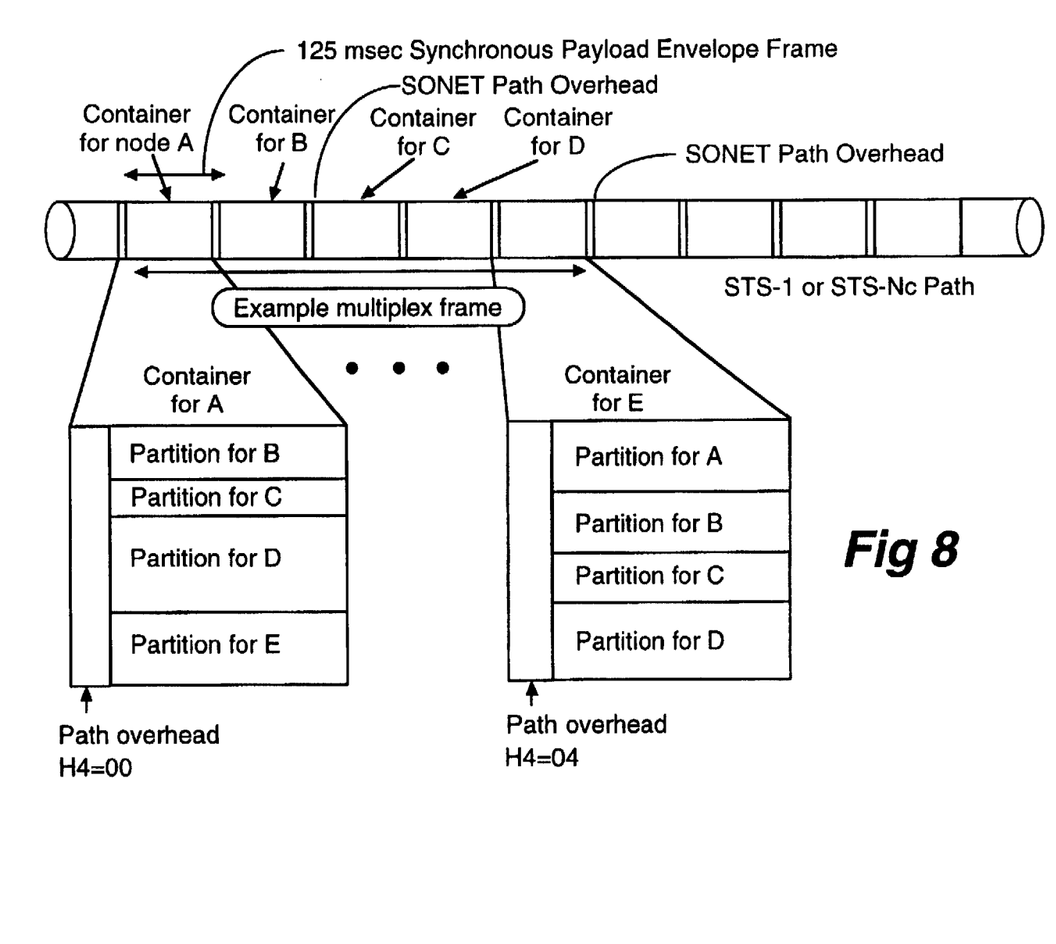
FIG. 8 shows the structure of a container, multiplex frame and partitions.

The frames of the STS-1/Nc path forming the domain are organized into multiplex frames where each STS-1/Nc frame within the multiplex frame is a container. FIG. 8 shows the structure of multiplex frames. The alignment of the multiplex frame is indicated using the multiframe indicator (H4) byte in the SONET path overhead. This byte contains a continuous binary modulo n count where n is the number of frames in the multiplex frame. The path layer ring can be assigned to operate bidirectionally, thus providing two physically diverse paths between any two stevedores.

In many applications, it is not necessary for all the networking functions in a domain to be fully mesh interconnected. Often, it is desirable to have all the nodes but one connected to the one remaining node, creating a logical star topology. In this case, the domain node associated with the hub of the star would be allocated all of the containers. Traffic flowing from the hub to all of the other nodes would be carried in the partitions that the master container packer generates on the ring. Each slave would empty the partition allocated to it and then refill the partition with traffic flowing to the hub. Thus the master resizes each partition based on the capacity requirements of the traffic flowing from the hub to the node associated with that partition as well as on the needs of the traffic flowing back to the hub. This means that the same capacity is allocated in both directions.

Figure 9:
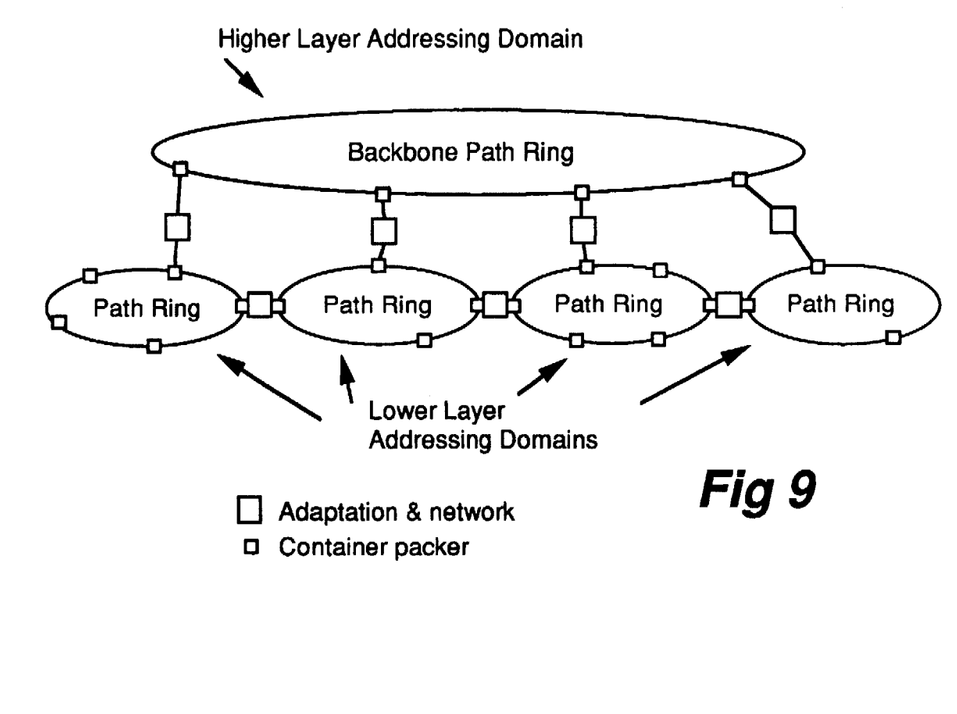
FIG. 9 illustrates a hierarchical addressing/routing arrangement.

It is also possible that the stevedores can be organized hierarchically, either to limit routing table size in lower layer stevedores, or to take advantage of hierarchical addressing, as seen in FIG. 9. The stevedores on a single path ring can be part of a single addressing domain. A set of path rings, and consequently all the stevedores attached to them, can have a peer relationship. A higher level path backbone ring can be used to interconnect the path rings at the lower level. If the addressing used by the networking functions is hierarchical, then the networking functions on the backbone ring only need look at the portion of the address identifying the lower layer domain to get across the backbone path ring. Similarly, networking functions on the lower layer rings simply forward traffic to the networking function on the backbone ring if they do not recognize the portion of the address that specifies the lower layer domain. Otherwise, they use the portion of the address that specifies the individual networking function to get across the lower layer ring.

In this embodiment, as each slave packer fills in the current container, it requests an increment, a decrement, or an absolute size for subsequent partitions. This request would be based on the status of container buffers indicated by the networking unit in the slave node. The master sees the requests from all slaves and repartitions subsequent containers to try to fairly meet all their requests.

In a further embodiment, the master node decides to increment or decrement subsequent partitions based on the fill of previous incoming partitions. For example, all full partitions could be incremented at the expense of non-full partitions until all partitions were either full or reduced to near zero. Then, smaller full partitions would be incremented at the expense of bigger full partitions until all full partitions are equal in size.

If the master cannot meet the demands of the slaves, then it can request more containers per multiplex frame from the domain controller node. If this does not solve the problem, then the path loop bandwidth will have to be increased.

As seen in the above description, this embodiment provides a means for SONET-based transport networks to provide connections at virtually any bandwidth, and to allow that bandwidth to vary in real-time according to instantaneous traffic demands. It also allows many such connections to share transport capacity on a statistical basis. This increases the efficiency of bandwidth utilization on the transport network. Telecommunications transport networks based on traditional SONET only allow point-to-point path layer connections at one of three granularities, 1.7 Mb/s, 50 Mb/s, or n×150 Mb/s. These bandwidths are reserved across the entire network regardless of instantaneous traffic demands.

Figure 10:
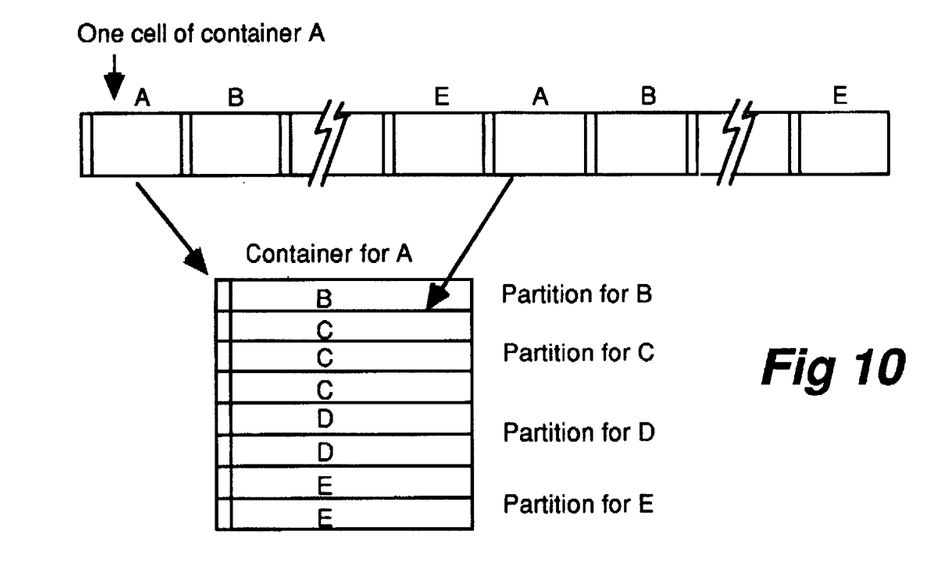
FIG. 10 shows the structure of a container according to a further embodiment of the invention.

Referring to FIG. 10, another example of the container concept is illustrated. In this embodiment, the networking function uses ATM cells as the traffic element that is routed. The container structure can be as in FIG. 2, where each partition carries ATM cells. In the further embodiment of FIG. 10, however, it may be more efficient to have the containers interleaved with each other at the cell level. Thus the multiplex frame now consists of cells. The cells that make up a container are allocated based on their position within the multiplex frame. The capacity associated with a container depends on the number of cells within a frame that are allocated to that container. Within the container, cells are allocated to a partition under the control of the master container packer for that container.

While the SONET environment discussed above is the main area of application, the present invention provides, in other similar networks, a novel and efficient way of establishing mesh connectivity among nodes which may be, for example, IP Routers or ATM switches with enhanced interfaces to container packers. The nodes in such networks do not have to dedicate a separate port for each connection to another node, and thus port utilization is increased. Furthermore, since many networking nodes can be directly interconnected on a path ring and the path ring can be organized into a hierarchy, the number of networking nodes that a given traffic flow will have to tandem through is minimized. This has many beneficial effects, including lower delay, lower delay variation, and higher throughput.

This invention further provides the capability of sharing a multipurpose SONET/SDH network, where some paths of the network carry conventional traffic (circuit-based), while other paths are used in conjunction with the adaptive multiplex frame concept to provide facilities for multi-service transport in the manner described above. Thus, using this invention, both circuit switched services and packet services are carried on the same SONET/SDH physical layer facilities.

What is claimed is:

1. In a communications network including a domain containing a plurality of nodes connected in a ring or in a virtual ring, a method of providing a virtual mesh connectivity of digital information between source nodes and destination nodes among the nodes, comprising steps of:

transmitting into the domain a multiplex frame of the digital information from a domain controller node, the multiplex frame consisting of containers which are respectively allocated to the destination nodes, each container having partitions which are respectively allocated to source nodes;

loading the digital information at one or more source nodes into the respective partitions of the containers which are allocated to destination nodes; and unloading the digital information at one or more destination nodes from said containers.

2. The method according to claim 1, comprising further steps of:

varying the sizes of any one or any number of the following:
the multiplex frame, containers and partitions, in order to adjust the capacity of connections.

3. The method according to claim 2 wherein the containers are in a fixed unit size, comprising a further step of:

varying the sizes of either or both of the multiplex frame and partitions, in order to adjust the capacity of connections.

4. The method according to claim 2 wherein the step of varying the sizes comprises a step of:

varying the number of containers allocated to a destination node in a multiplex frame in order to adjust the capacity of a connection.

5. The method according to claim 2 wherein the multiplex frame and containers are in fixed unit sizes, comprising a further step of:

varying the sizes of partitions, in order to adjust the capacity of connections.

6. The method according to claim 2 wherein the step of varying the sizes is performed in response to a control signal exchanged among the source node, the domain controller node and the destination node.

7. The method according to claim 3 wherein the step of varying the sizes is performed in response to a control signal exchanged among the source node, the domain controller node and the destination node.

8. The method according to claim 4 wherein the step of varying the number of containers is performed in response to a control signal exchanged among the source node, the domain controller node and the destination node.

9. The method according to claim 5 wherein the step of varying the sizes is performed in response to a control signal exchanged among the source node, the domain controller node and the destination node.

10. The method according to claim 1, wherein the step of transmitting a multiplex frame further comprises steps of:

providing respective containers at locations indicative of the destination nodes within the multiplex frame; and providing respective partitions at locations indicative of the source nodes within the container.

11. The method according to claim 4, wherein the step of transmitting a multiplex frame further comprises steps of:

providing respective containers at locations indicative of the destination nodes within the multiplex frame; and providing respective partitions at locations indicative of the source nodes within the container.

12. The method according to claim 5, wherein the step of transmitting a multiplex frame further comprises steps of:

providing respective containers at locations indicative of the destination nodes within the multiplex frame; and providing respective partitions at locations indicative of the source nodes within the container.

13. The method according to claim 1 wherein the steps of loading and unloading digital information comprises steps of:

loading at the source node and unloading at one or more destination nodes the digital information in its native form.

14. The method according to claim 13 wherein the native form is any of the following: Ethernet, Frame Relay, Token Ring and ATM.

15. The method according to claim 4 wherein the steps of loading and unloading digital information comprises steps of:

loading at the source node and unloading at one or more destination nodes the digital information in its native form.

16. The method according to claim 15 wherein the native form is any of the following: Ethernet, Frame Relay, Token Ring and ATM.

17. The method according to claim 5 wherein the steps of loading and unloading digital information comprises steps of:

loading at the source node and unloading at one or more destination nodes the digital information in its native form.

18. The method according to claim 17 wherein the native form is any of the following: Ethernet, Frame Relay, Token Ring and ATM.

19. The method according to claim 1 wherein there are two or more domains and there are nodes which are connected to two or more domains so that all the domains are connected to each other, comprising a further step of:

transmitting into a respective domain a multiplex frame of the digital information from a respective domain controller node.

20. The method according to claim 19 wherein the two or more domains are arranged in a hierarchical order.

21. A node in a communication network which provides a virtual mesh connectivity among nodes in a domain by means of multiplex frames of digital information, each multiplex frame consisting of containers which are respectively allocated to destination nodes, each container having partitions which are respectively allocated to source nodes, comprising:

a container packer for loading the digital information into the partition allocated to it, of the container allocated to the destination node to which the digital information is destined; and a container unpacker for unloading the digital information from the container allocated to it.

22. The node according to claim 21, further comprising a networking device for arranging and storing digital information according to nodes to which it is destined and from which it has arrived.

23. The node according to claim 22, wherein the network device further comprises a storage device for storing digital information to and from the container packer and unpacker.

24. The node according to claim 23, further comprising:

a traffic controller for communicating with its container packer and unpacker as to the status of the storage device and with the traffic controller of other nodes for establishing the route between the source and destination nodes.

25. A communications network for providing a virtual mesh connectivity of digital information between source nodes and destination nodes, comprising:

all the nodes residing in a domain and being connected in a ring or a virtual ring, one node being a domain controller node;

the domain controller node including a transmitter for transmitting a multiplex frame of digital information into the ring, the multiplex frame consisting of containers which are respectively allocated to the destination nodes, each container having partitions which are respectively allocated to the source nodes;

each source node having a container packer for loading the digital information into the partition allocated to it, of the container allocated to the destination node to which the digital information is destined; and each destination node having a container unpacker for unloading the digital information from the container allocated to it.

26. The communications network according to claim 25, wherein each node has a container packer and a container unpacker to become a source node and destination node.

27. The communications network according to claim 26, wherein each node has a networking device for arranging and storing digital information according to nodes to which they are destined and from which they have arrived.

28. The communications network according to claim 27, wherein the network device of each node includes a storage device for storing digital information to and from the container packer and unpacker.

29. The communications network according to claim 28, including a traffic controller for communicating with its container packer and unpacker as to the status of the storage device and with the traffic controller of other nodes for establishing the route between the source and destination nodes.

* * * * *